(12) United States Patent
Yeh et al.

(10) Patent No.: US 8,457,312 B2
(45) Date of Patent: Jun. 4, 2013

(54) CABLE LENGTH DETECTION AND SIGNAL COMPENSATION APPARATUS AND METHOD FOR A KEYBOARD VIDEO MOUSE SWITCH AND EXTENDER

(75) Inventors: Tsung I Yeh, Taiwan (TW); Fu-Chin Shen, Keelung (TW)

(73) Assignee: Aten International Co., Ltd., Shijr (TW)

(*) Notice: Subject to any disclaimer, the term of this patent is extended or adjusted under 35 U.S.C. 154(b) by 1233 days.

(21) Appl. No.: 12/273,451

(22) Filed: Nov. 18, 2008

(65) Prior Publication Data

US 2010/0124270 A1    May 20, 2010

(51) Int. Cl.
*H04N 7/167* (2006.01)

(52) U.S. Cl.
USPC ........... 380/217; 348/528; 348/549; 348/607; 375/345

(58) Field of Classification Search
USPC ........... 380/217; 348/528, 549, 607; 375/345
See application file for complete search history.

(56) References Cited

U.S. PATENT DOCUMENTS

| | | | |
|---|---|---|---|
| 4,718,168 A | 1/1988 | Kerr | |
| 5,159,275 A | 10/1992 | Fujimura | |
| 5,714,876 A | 2/1998 | Baker | |
| 5,818,378 A | 10/1998 | Cheng et al. | |
| 6,489,854 B1 | 12/2002 | Chen | |
| 7,221,389 B2 | 5/2007 | Ahern et al. | |
| 7,796,194 B2 * | 9/2010 | Hall | 348/558 |
| 8,090,553 B2 * | 1/2012 | Chen | 702/158 |
| 2002/0191718 A1 | 12/2002 | Ellis, Sr. | |
| 2003/0147359 A1 | 8/2003 | Chen | |
| 2005/0227517 A1 | 10/2005 | Chen | |
| 2006/0116030 A1 | 6/2006 | Niiyama et al. | |

FOREIGN PATENT DOCUMENTS

| | | |
|---|---|---|
| EP | 1646230 A1 | 4/2006 |
| TW | 00303435 | 4/1997 |

OTHER PUBLICATIONS

Chinese Office Action, dated May 16, 2011, in a counterpart Chinese patent application, No. CN 200910158153.8.
Avocent AMX Series Installer/User Guide, 2003, (relevant portions: p. 3, "video compensation"; p. 5, last paragraph).
"Avocent AMIQ Modules AMIQ-PS2, AMIQ-PS210, AMIQ-PS232", http://www.42u.com/amiq-ps2.htm, 1 page, unknown date, printed from the Internet on Mar. 7, 2011.

* cited by examiner

*Primary Examiner* — Eleni Shiferaw
*Assistant Examiner* — Paul Callahan
(74) *Attorney, Agent, or Firm* — Chen Yoshimura LLP (57) ABSTRACT

An apparatus in a video signal transmission system for measuring cable length and compensating for cable loss is described. A number of pilot signals of different frequencies are compressed into one of the three color signals during the vertical sync periods in a time-division manner. The vertical and horizontal sync signals are compressed into the other two color signals. The video signal is transmitted over a cable having at least three pairs of wires, each color signal being transmitted by one pair of wires. A pilot signal converting circuit obtains the levels of the pilot signals transmitted by the cable. A compensation control circuit averages the levels of the multiple pilot signals of different frequencies over a number of vertical sync periods, and generates compensation control signals based on the average level of the pilot signals. The compensation control signals are used to perform video signal compensation.

22 Claims, 10 Drawing Sheets

CABLE LENGTH DETECTION AND SIGNAL COMPENSATION APPARATUS AND METHOD FOR A KEYBOARD VIDEO MOUSE SWITCH AND EXTENDER

BACKGROUND OF THE INVENTION

1. Field of the Invention

This invention relates to apparatus and method for cable length detection and signal compensation for a cable for transmitting analog signals.

2. Description of the Related Art

In a computer system, video signals are typically transmitted to a monitor from a video adapter via a cable. The video signals are degraded by the impedance matching of the cable. If the video signals are under-compensated due to cable loss, the images observed on the monitor may be blurred. On the other hand, if the video signals are over-compensated, over-excited signals may be formed, resulting in a reduction of monitor lifetime. Moreover, when the length of the cable exceeds ten meters, the video signals are considerably weakened, thus degrading the quality of images and may cause operation errors because of the unclear display. Specifically, various types of cables, such as a shielding twisted pair (STP), un-shielding twisted pair (UTP) and a foil twisted pair (FTP), have distinct frequency responses. The video signals therefore exhibit different attenuation phenomena when they are transmitted on various cables. The above reasons make it is difficult to use a simple signal compensation device in a fixed way to compensate for the signal attenuations occurring on cables of different types or different lengths.

In order to overcome the problems discussed above, methods are developed to measure the length of a cable and to compensate for signal attenuation based on measured cable length. Some systems use a time difference between transmission and return of high-speed streams to calculate the length of cable. In another system, described in commonly owned U.S. Patent Application Publication 2005/0227517, published Oct. 13, 2005, entitled "Cable length detection apparatus and method for a keyboarding video mouse switch," a cable length detection apparatus is provided to detect the length of a cable having at least three pairs of wires for transmitting color video signals. In this system, shown in FIG. 1 (identical to FIG. 1 of the above reference commonly owned application), a signal compressing circuit 102 compresses an electrical signal into one of the three color signals of the video signal transmitted by the cable 104. A signal converting circuit 106 at the receiving end of the cable converts the electrical signal transmitted by the pair of wires into a value, and a length calculating circuit 108 calculates the length of the cable according to the value for subsequent use by signal compensation devices to compensate for signal attenuation caused by the cable 104. The cable 104 has at least three pairs of wires, which separately transmit three color signals contained in the video signal, such as a red color signal (R), a green color signal (G) and a blue color signal (B), or a luminance signal (Y) and two chrominance signals (U) and (V). In addition to three color signals, the video signal also includes a horizontal sync signal (H) and a vertical sync signal (V). The horizontal and vertical sync signals are compressed into two of the three color signals, and the electrical signal is compressed into the third color signal by the signal compressing circuit 102 when the vertical sync signal is enabled. A monitor typically does not display any video signals when the vertical sync signal is enabled. In other words, when the vertical sync signal is enabled, the electrical signal compressed into the third color signal does not form any images on the display, and therefore does not affect the users.

Figure 1:
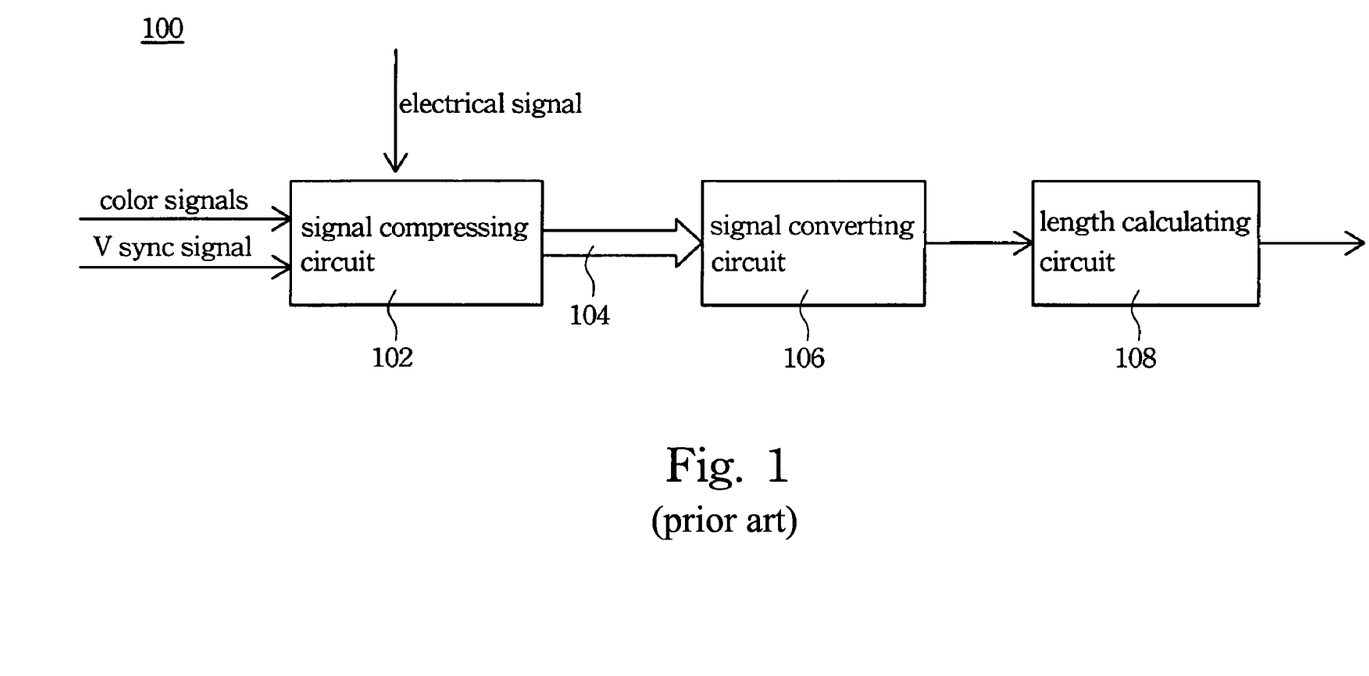
FIG. 1 (Prior Art) illustrates a prior art system for measuring a length of a cable.
Figure 2:
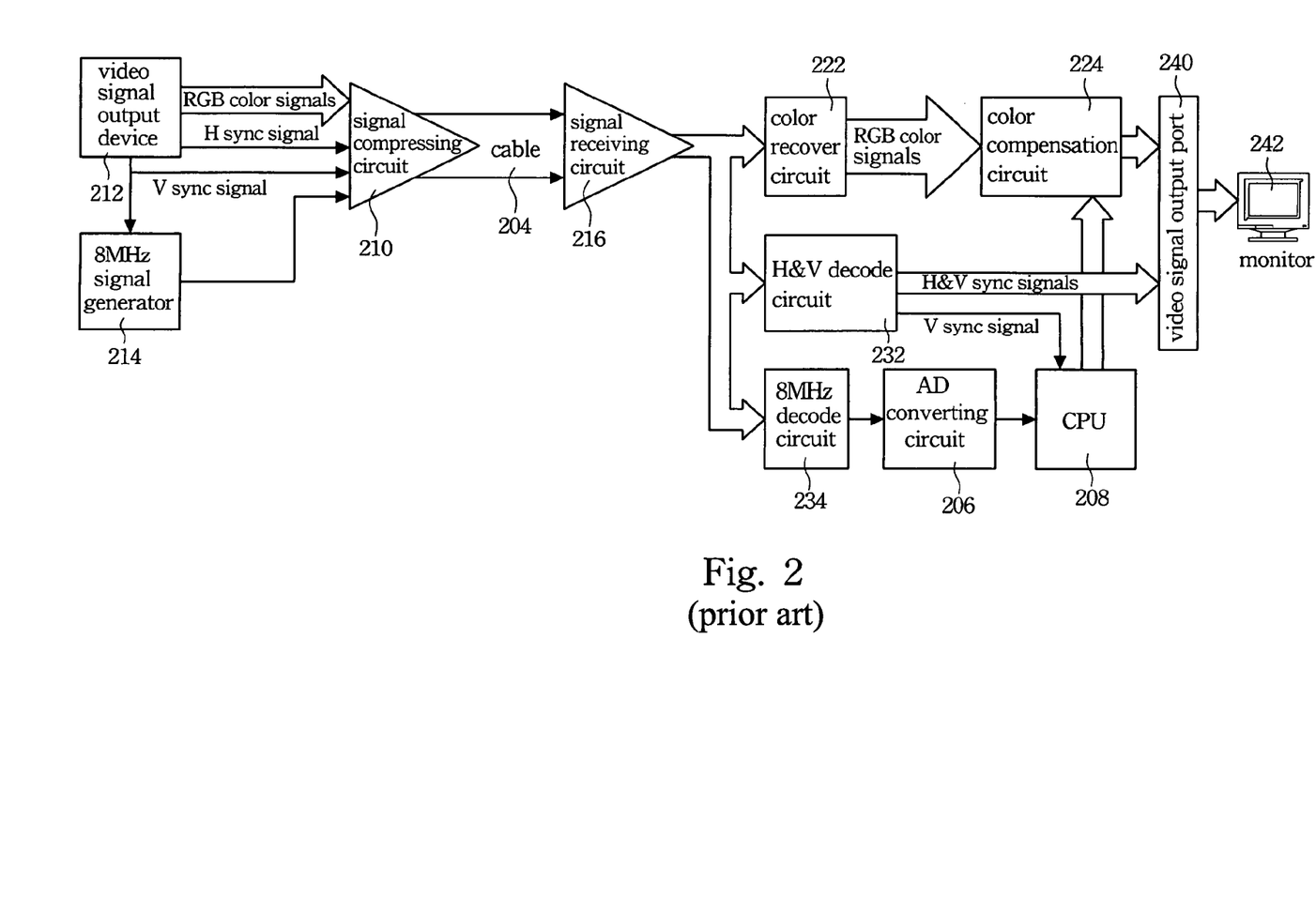
FIG. 2 (Prior Art) is a more detailed schematic block diagram illustrating the system of FIG. 1.

FIG. 2 (identical to FIG. 2 of the above reference commonly owned application) is a more detailed schematic diagram of the system in FIG. 1. As shown in FIG. 2, a video output device 212, such as a video card for computers, outputs video signals to a monitor 242 through a cable 204. The video signal comprises three RGB color signals, a horizontal sync signal and a vertical sync signal. The frequencies of the video signals can be up to 165 MHz. Signal attenuation of the video signals depend on the frequency response of the cable 204 and the frequencies of the video signals. In the system shown in FIG. 2, a square wave signal of 8 MHz is generated by an 8 MHz signal generator 214 for performing cable length measurement. When the vertical sync signal is enabled, the signal compressing circuit 210 compresses the 8 MHz square wave signal into the third color signal that is not used by the horizontal and vertical sync signals. The video signal is received by a signal receiving circuit 216 after being transmitted by the cable 204, and reconverted by a color recover circuit 222 into three color signals without sync signals and the square wave signals. A horizontal and vertical sync signals decode circuit 232 decodes the video signals from the signal receiving circuit 216 to obtain the horizontal sync signal and the vertical sync signal without the three color signals and the square wave signals, and an 8 MHz signal decode circuit 234 decodes the video signals from the signal receiving circuit 216 to obtain the 8 MHz square wave signal without the three color signals and the sync signals. The 8 MHz square wave signal transmitted by the cable 204 is converted into a value, such as a voltage, by an analog-to-digital (AD) converting circuit 206. Then, a central processing unit (CPU) 208 calculates the length of the cable 204 according the magnitude of the value, and a color compensation circuit 224 is used to compensate for the degraded color signals based on the value of cable length calculated. The horizontal sync signal, the vertical sync signal and the there compensated color signals are output to the monitor 242 through a video output port 240 for displaying the images which are substantially free of signal attenuation.

SUMMARY OF THE INVENTION

The present invention is directed to an improved system for measuring a length of a cable for transmitting an analog signal and for compensating for signal loss due to the cable length.

An object of the present invention is to provide such a system that can more accurately measure signal loss in a cable for signals of different frequencies.

Another object of the present invention is to provide such a system in which the amount of signal compensation can be achieved in a continuous manner.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a cable length detection and signal compensation system for processing a video signal transmitted over a cable, the cable having at least three pairs of wires, the video signal having first, second and third color signals each transmitted by a pair of wires, the system comprising: a signal compressing circuit disposed upstream of the cable for compressing two or more electrical signals into the third color signal of the video signal when a vertical sync signal of the video signal is enabled, wherein the two or more electrical signals have different frequencies and are compressed into the third color signal during different time periods; a signal converting circuit disposed downstream of the cable for converting the two or more electrical signals in the third color signal into direct current signals representing levels of the electrical signals after being transmitted by the cable; and a compensation control circuit for generating one or more compensation control signals based on the direct current signals representing levels of the electrical signals.

In another aspect, the present invention provides a cable length detection and signal compensation method used in a video signal transmission system for transmitting a video signal having first, second and third color signals over a cable, the method comprising: (a) compressing two or more electrical signals into the third color signal of the video signal when a vertical sync signal of the video signal is enabled, wherein the two or more electrical signals have different frequencies and are compressed into the third color signal during different time periods; (b) transmitting the video signal over the cable, the cable having at least three pairs of wires, each color signal being transmitted over a pair of wires; (c) converting the two or more electrical signals in the third color signal into direct current signals representing levels of the electrical signals after being transmitted by the cable; and (d) generating one or more compensation control signals based on the direct current signals representing levels of the electrical signals.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide an improved cable length measurement and signal compensation system for measuring a length of a cable for transmitting an analog signal and for compensating for signal loss due to the cable. The general system configuration of the improved cable length measurement and signal compensation system is similar to the system shown in FIG. 1. In other words, the improved system 100 generally includes a signal compressing circuit 102, a signal converting circuit 106, and a length calculating circuit 108. The detailed structures of these circuits are different from those described in the above referenced commonly owned U.S. Patent Application Publication 2005/0227517, and are described below.

Figure 3:
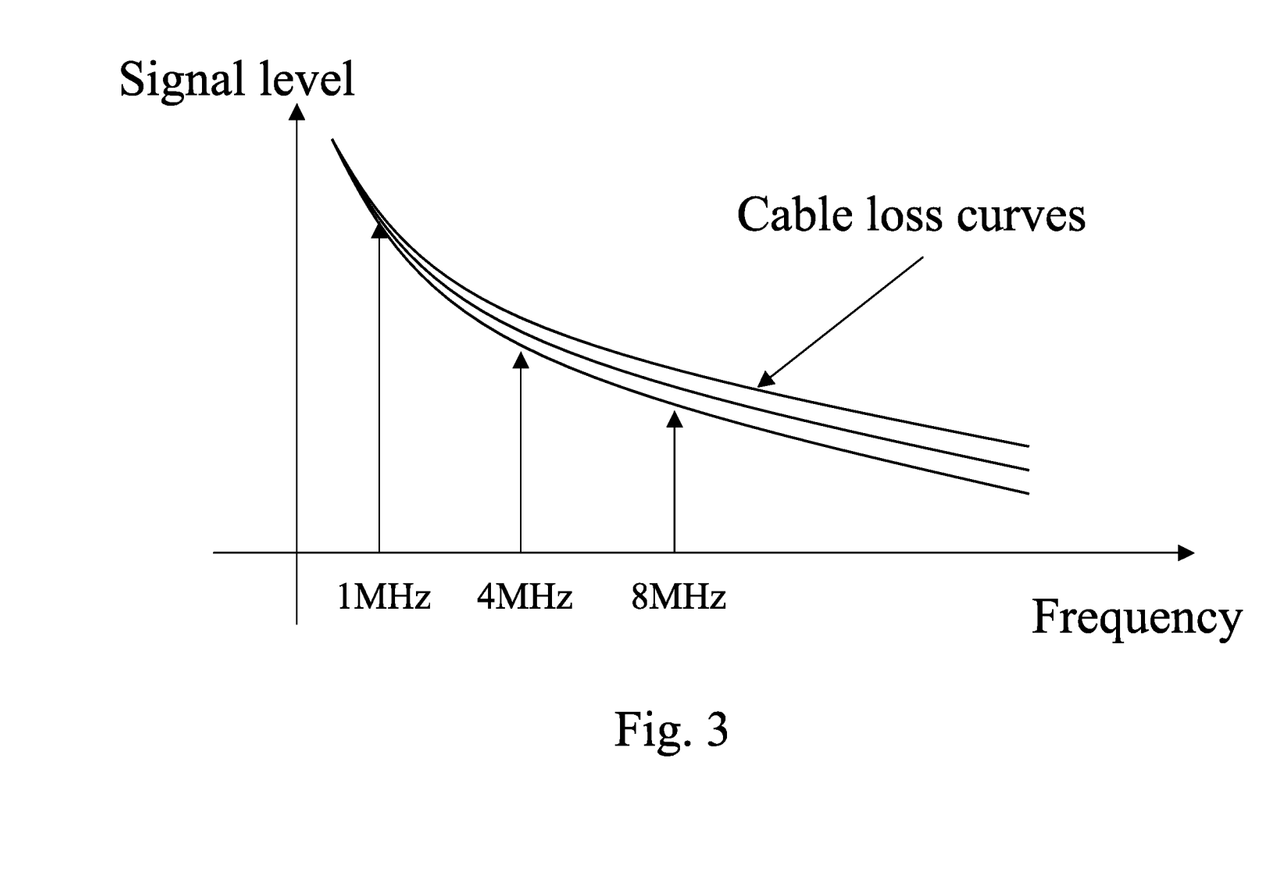
FIG. 3 schematically illustrates dependency of cable loss on frequency of the signal.

In a cable, attenuation of the signals depends on the frequency response of the cable and the frequencies of the signals. As schematically illustrated in FIG. 3, higher frequency signals experience higher loss in a cable, and the loss is not a linear function of frequency when the various frequency signals are transmitted in an identical length of cable. The three cable loss curves may present various kinds of cables, such as CAT5, CAT3 and 150-hm STP cables. In such a case, the lower curve would present the CAT5 cable and the upper curve would present the 150-ohm STP cable. Or, the three cable loss curves may present various lengths of an identical kind of cable, such as 100 feet, 200 feet and 300 feet of CAT5 cables. In such a case, the lower curve would present the 100 feet of CAT5 cable and the upper curve would present the 150-ohm STP cable. Thus, when an electrical signal of a single frequency is used to measure the cable length, as is the case in the above-mentioned commonly owned patent application, the measurement cannot take into account the frequency dependency of the signal attenuation.

Figure 4:
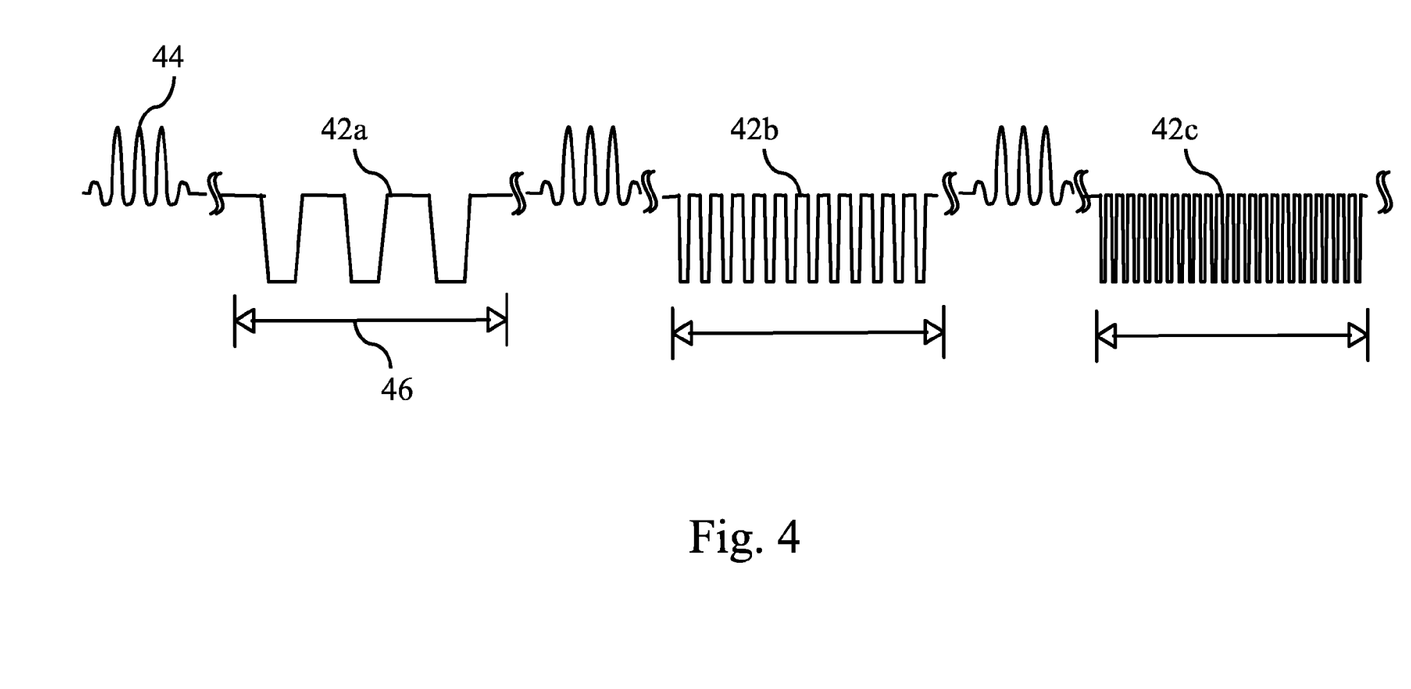
FIG. 4 schematically illustrates a time-division technique for transmitting pilot signals of different frequencies in a video signal according to an embodiment of the present invention.

The improved cable length measurement and signal compensation system according to embodiments of the present invention uses a plurality of electrical signals (pilot signals) of different frequencies to measure signal deterioration at various different frequencies, and performs signal compensation accordingly. To accomplish this, a plurality of pilot signals of different frequencies are compressed into a color signal of the video signal using a time-division multiplexing technique. More specifically, the plurality of pilot signals are compressed into one of the three color signals (hereinafter "the third color signal" for convenience) when the vertical sync signal of the video signal is enabled, and they are compressed into the third color signal during different time periods. FIG. 4 is an exemplary timing chart schematically showing three pilot signals 42a, 42b and 42c of different frequencies being compressed into the third color signal 44 in a time-division manner. In the illustrated example, each of the pilot signals 42a, 42b and 42c is compressed into one vertical sync period 46 of the video signal, and the three pilot signals are compressed into successive vertical sync periods and are repeated. Alternatively (not shown), the three pilot signals may be compressed into the same vertical sync period in a time-division manner. As another alternative, a pilot signal of one frequency may be compressed into successive vertical sync period, followed by a pilot signal of another frequency compressed into successive vertical sync period, etc. The exact scheme of time-division multiplexing is not critical, provided that within each reasonably short period of time, all pilot signals of different frequencies are compressed into the color signal. In a preferred embodiment, the three pilot signals 42a, 42b and 42c are 1 MHz, 4 MHz and 8 MHz signals, respectively, but other frequencies may also be used. Further, fewer or more than three pilot signals of different frequencies may be used, such as two, four, etc. Although in the example in FIG. 4 the pilot signals are square waves, sine wave, cosine wave, or other waveforms may be used for the pilot signals, such as triangular, sinusoidal, etc.

Figure 5:
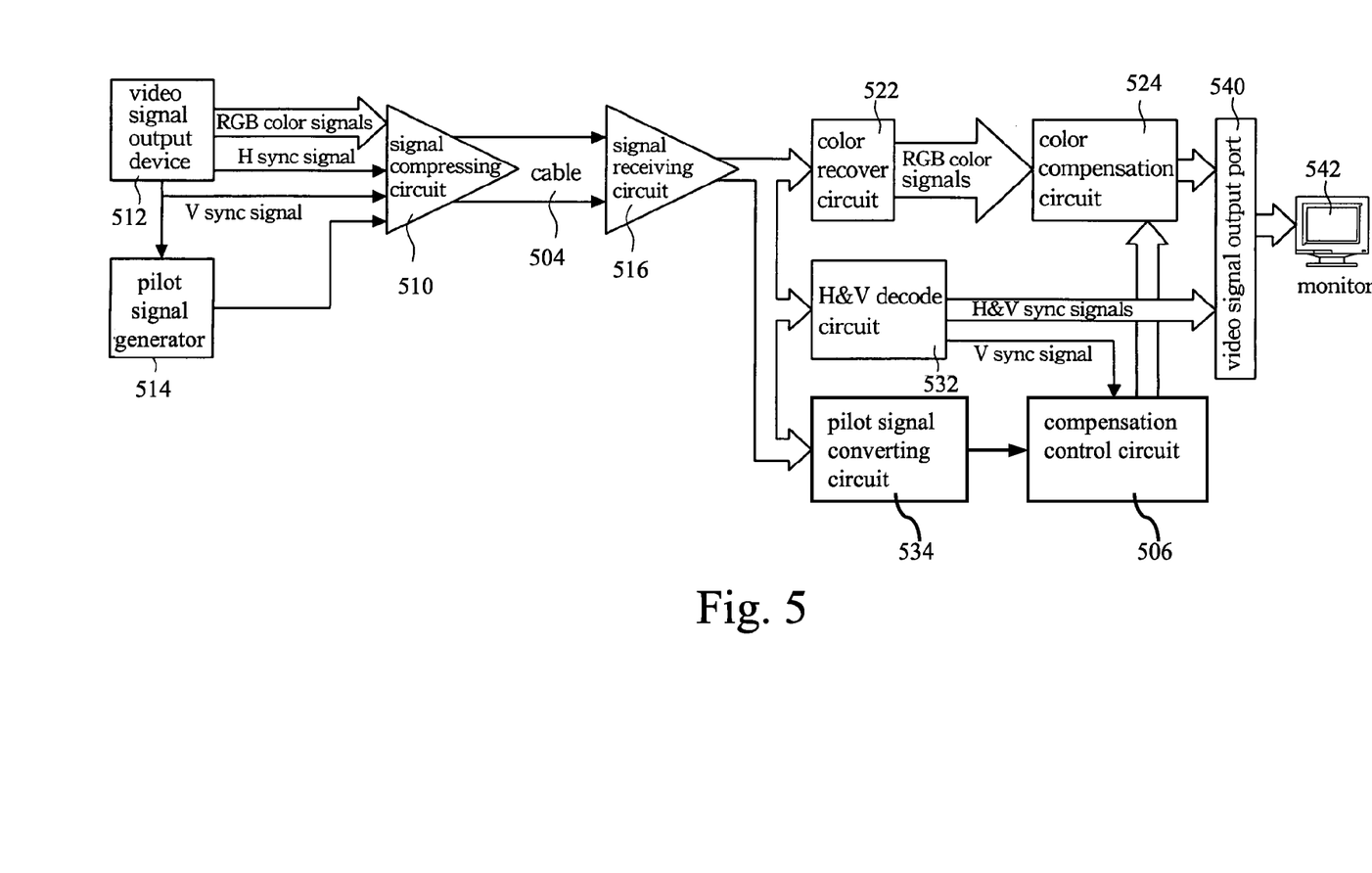
FIG. 5 is a schematic block diagram illustrating a system for measuring the length of a cable and compensating for signal loss according to an embodiment of the present invention.

FIG. 5 is a schematic diagram of the cable length measurement and signal compensation system according to an embodiment of the present invention. Similar components in FIGS. 5 and 2 are similarly labeled. As shown in FIG. 5, a video output device 512, such as a video card for computers, outputs video signals to a monitor 542 through a cable 504. An example of the cable 504 is a CAT 5 (Category 5) cable, CAT 5e cable, CAT 6 cable or CAT 7 cable. The video signal comprises a red color signal (R), a green color signal (G), a blue color signal (B), a horizontal sync signal (H) and a vertical sync signal (V). In one embodiment, the video signal comprises a luminance signal (Y) two chrominance signals (U) and (V), a horizontal sync signal (H) and a vertical sync signal (V). The cable 504 has three pairs of wires, which separately transmit the red color signal (R), the green color signal (G) and the blue color signal (B). The horizontal sync signal (H) and the vertical sync signal (V) are separately compressed into any two of the three color signals (hereinafter the "first" and "second" color signals for convenience). A pilot signal generator 514 generates a plurality of pilot signals. When the vertical sync signal is enabled, a signal compressing circuit 510 compresses the plurality of pilot signals into the third color signal (i.e. the color signal that is not used by the horizontal and vertical sync signals) in a time-division manner as described above. The signal compressing circuit 510 also compresses the vertical and horizontal sync signals into the first and second color signals. The three color signals are then transmitted from the signal compressing circuit 510 to the signal receiving circuit 516 by the cable 504.

Figure 6A:
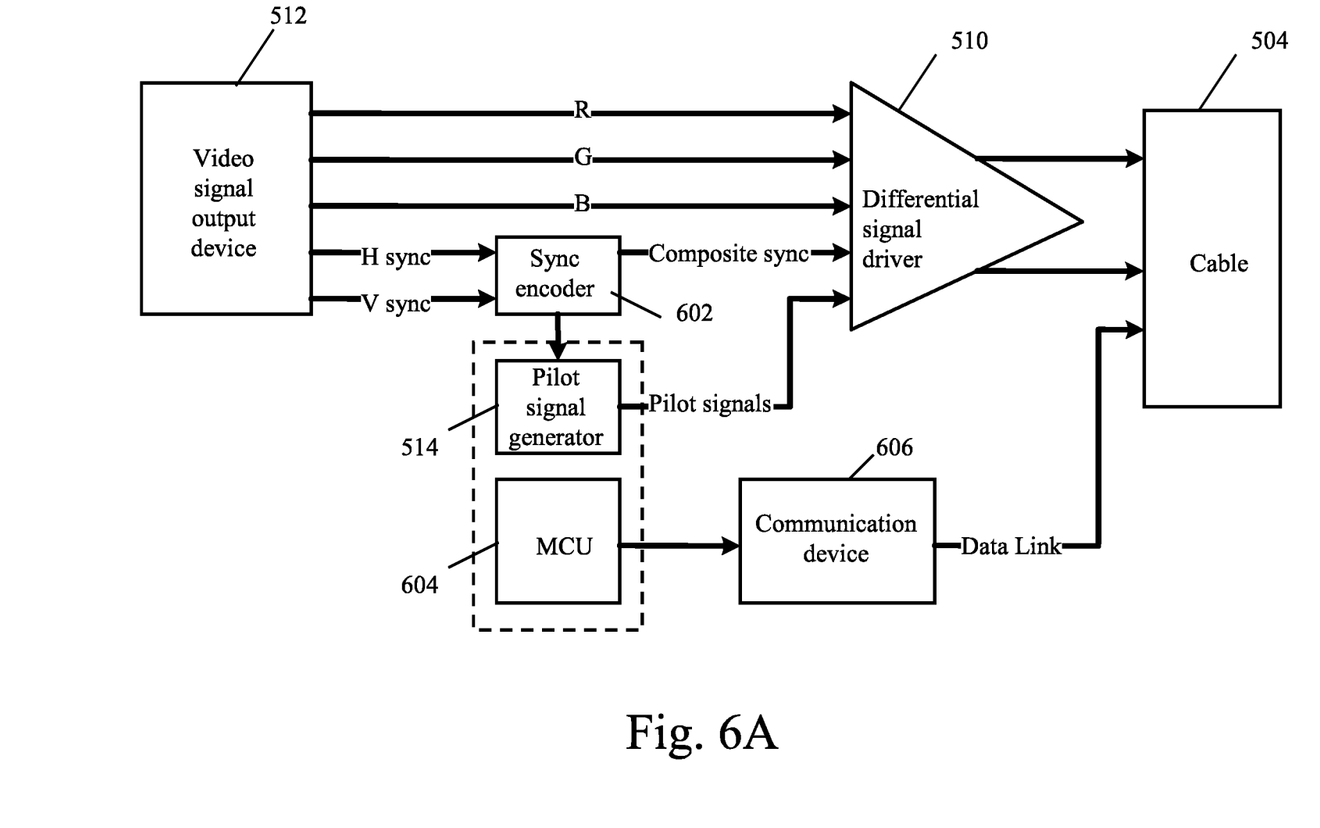
FIGS. 6A-6C are more detailed circuit diagrams of portions of the system shown in FIG. 5.
Figure 7A:
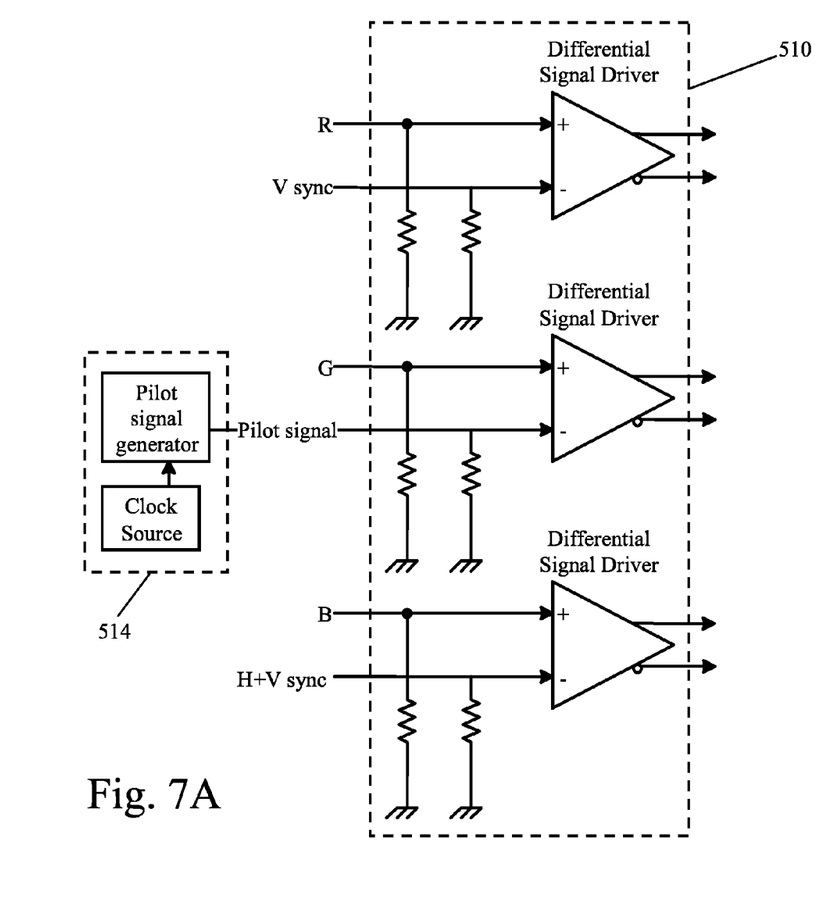
FIG. 7A is a circuit diagram of the differential signal driver of the system shown in FIGS. 5 and 6A.

FIG. 6A is a more detailed circuit diagram of a portion of the cable length measurement and signal compensation system of FIG. 5, showing the portion before the cable 504 in FIG. 5. As shown in FIG. 6A, the video signal output device 512 outputs the R, G and B signals to the differential signal driver 510, and outputs the H sync and V sync signals to a sync encoder 602 (or a codec). The sync encoder 602 outputs a composite sync signal to the differential signal driver 510 and outputs the H and V sync signals to the pilot signal generator 514. The pilot signal generator 514 outputs pilot signals to the differential signal driver 510. The differential signal driver 510 encodes the sync and pilot signals into the R, G and B signals, converts them into differential signals, and outputs them to the cable 504. That is, the differential signal driver 510 respectively compresses the sync and pilot signals into the R, G and B signals, and outputs differential signals to the cable 504. FIG. 7A further illustrates the detailed structure of the differential signal driver 510. The R signal and the V sync signal are processed and then outputted a first differential signal to a first pair of wires in the cable 504 by a first circuit in the differential signal driver 510. The G signal and the pilot signal are processed and then outputted a first differential signal to a second pair of wires in the cable 504 by a second circuit in the differential signal driver 510. The B signal and the H+V sync signal are processed and then outputted a third differential signal to a third pair of wires in the cable 504 by a third circuit in the differential signal driver 510. The invention is not been limited thereto above illustration and description.

Also shown in FIG. 6A is a control circuit 604, a microcontroller unit MCU in this example, which generates keyboard, mouse, audio, virtual media or any data stream. These data are then outputted by a communication device 606 via a data link to the cable 504. The data link feeds to the fourth pair of wires of the cable 504. The pilot signal generator circuit 514 and the MCU 604 may be implemented as one FPGA (field programmable gate array), CPLD (complex programmable logic device) or ASIC (application specific integrated circuit).

In the preferred embodiment, the horizontal sync signal, the vertical sync signal and the plurality of pilot (multi-tone) signals are each carried in one of the three color video signals.

However, other ways of matching the three color signals, the horizontal sync signal, the vertical sync signal and the plurality of pilot signals may be used. Further, if the horizontal and vertical sync signals of the video signal are combined together by the video output device, such as the video signal used in a SUN system, the horizontal and vertical sync signals are separated from each other first and then compressed separately into the color signals.

Referring again to FIG. 5, the color signals compressed with the vertical and horizontal sync and the plurality of pilot signals are received by a signal receiving circuit 516 after being transmitted by the cable 504. The color signals are reconverted by a color recover circuit 522 into RGB signals without the vertical and horizontal sync signals and the pilot signals. A horizontal and vertical sync signals decode circuit 532 decodes the color signals to obtain the horizontal sync signal and the vertical sync signal, respectively. A pilot signal converting circuit 534 processes the third color signal to obtain a direct current (DC) signal that represents the level of the pilot signals. The level of the pilot level signal is different during different vertical sync periods because the frequencies of the pilot signals are different. In a preferred embodiment, the horizontal and vertical sync signals decode circuit 532 and the pilot signal converting circuit 534 are three signal decode circuits separately connected to the three pairs of wires for decoding the horizontal sync signal, the vertical sync signal and the plurality of pilot signals, respectively. Based on the pilot level signal (a DC signal) outputted by the pilot signal converting circuit 534, a compensation control circuit 506 generates compensation control signals which are supplied to a color compensation circuit 524. The color compensation circuit 524 carries out signal compensation of the color signals, such as amplifying, adjusting and frequency compensation, according to the compensation control signals supplied by the compensation control circuit 506.

Figure 6B:
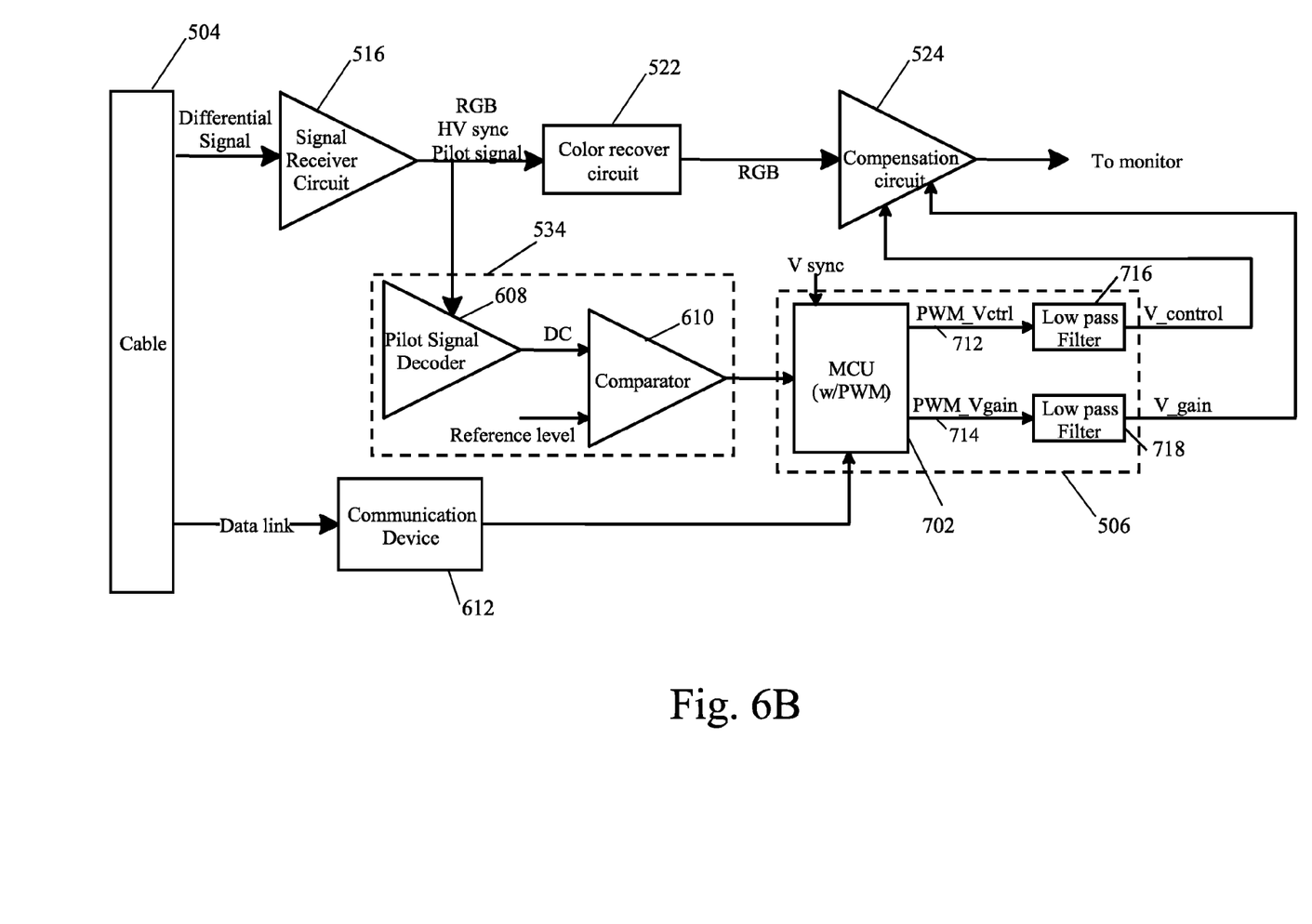
Figure 6C:
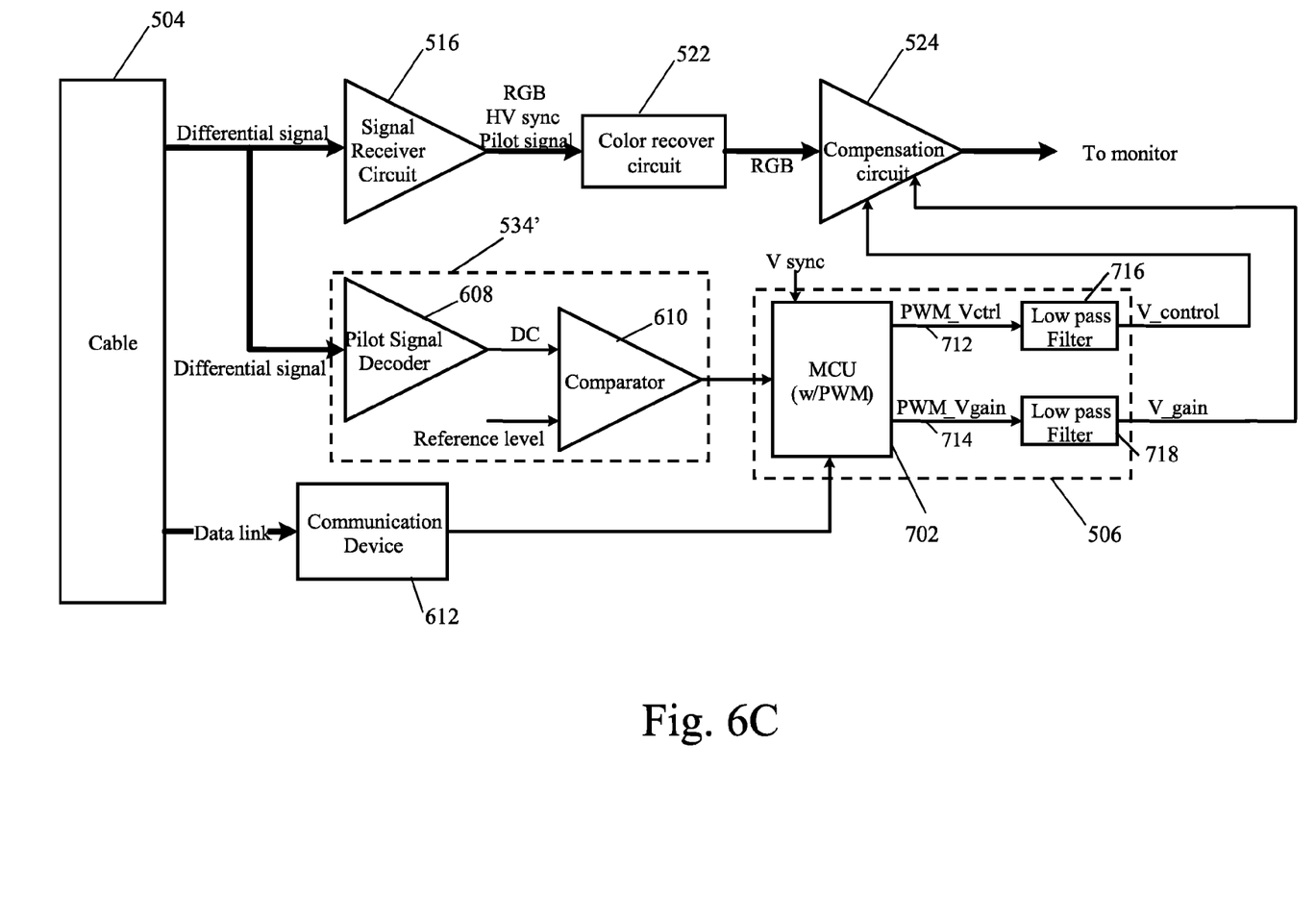

FIG. 6B is a more detailed circuit diagram of a portion of the cable length measurement and signal compensation system of FIG. 5, showing the portion after the cable 504 in FIG. 5. FIG. 6C is a circuit diagram of an alternative structure of the same portion. In the structure of FIGS. 5 and 6B, the pilot signal converting circuit 534 is downstream of the signal receiving circuit 516, while in the structure of FIG. 6C, the pilot signal converting circuit 534' directly receives the differential signals from the cable 504. The pilot signal converting circuit 534' includes a signal receiver component to convert the differential signals to non-differential signals or single end signals. The structures of FIGS. 6B and 6C are otherwise the same.

As shown in FIGS. 6B and 6C, the pilot signal converting circuit 534/534' includes a pilot signal decoder 608 which generates a DC signal representing the strength (DC level) of the pilot signal in the signals after they are transmitted by the cable 504, and a comparator 610 that compares the DC signal with a reference signal. The output of the comparator 610 is inputted to the compensation control circuit 506.

Figure 7B:
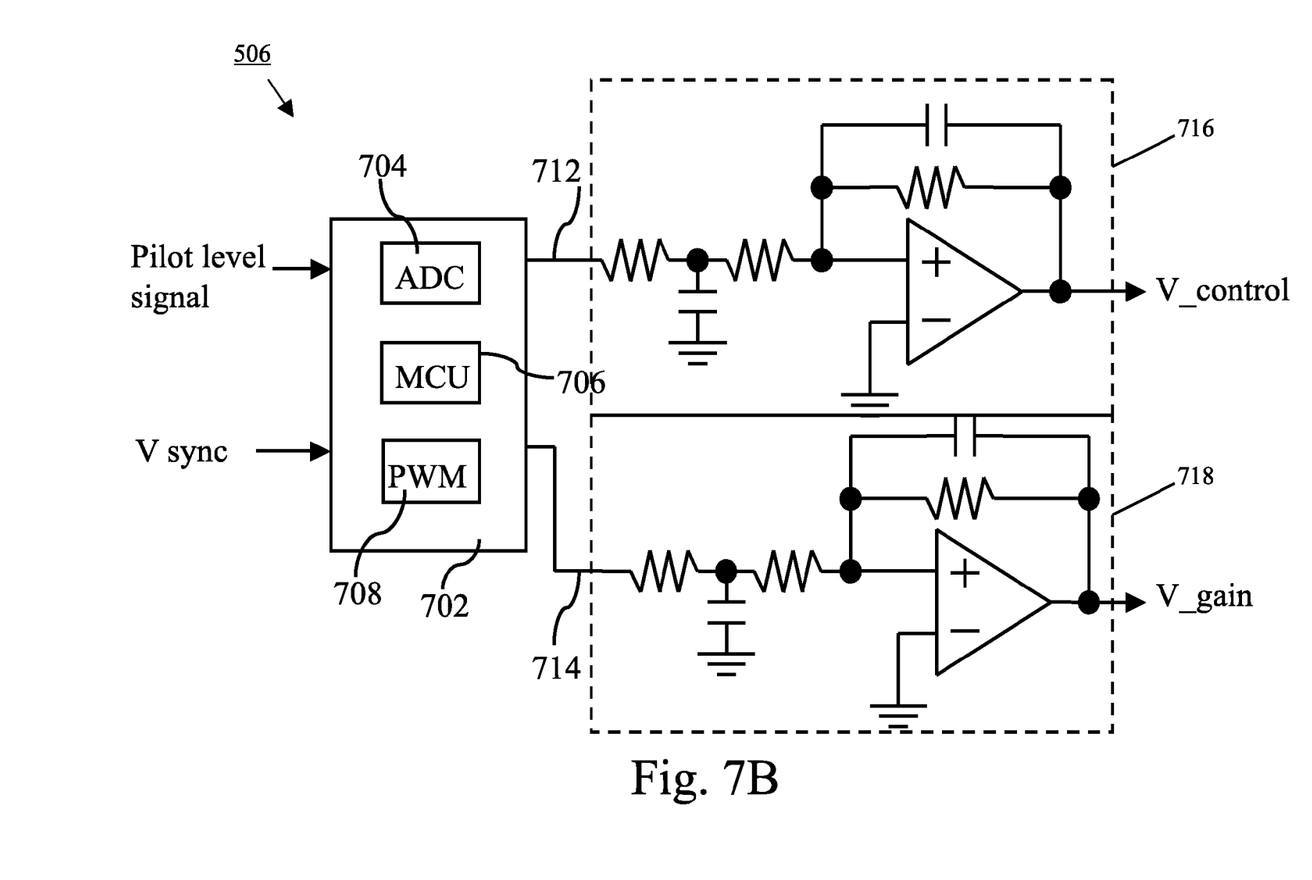
FIG. 7B is a circuit diagram of the compensation control circuit of the system shown in FIGS. 5, 6B and 6C.

The structure of the compensation control circuit 506 is further illustrated in FIG. 7B. As shown in FIGS. 6B, 6C and 7B, the pilot level signal generated by the pilot signal converting circuit 534/534' is received by a control section 702. An analog-to-digital converting circuit (ADC) 704 in the control section 702 converts the DC signal from comparator 610 into a digital value, which is inputted to a microcontroller unit 706. Note that alternatively, the ADC 704 may be implemented as an element separate from the control section 702. The vertical sync signal obtained by the vertical sync signal decode circuit 532 is also inputted into the control section 702 (see also FIG. 5). The microcontroller unit 706 calculates an average value of the pilot signal over a number of vertical sync periods. This average value represents an average of the levels of the plurality of pilot signals of different frequencies (it may include a DC bias component such as 0.7V). The number of vertical sync periods in the average calculation may be chosen based on the number of pilot signals of different frequencies and how they are time-division multiplexed into the color signal. For example, in the embodiment illustrated in FIG. 4, three pilot signals of different frequencies are compressed into the video signal in three successive vertical sync periods and repeated. In such an embodiment, the microcontroller unit 706 may average the pilot signal values over nine successive vertical sync periods, which include three vertical sync periods for each pilot signal. Generally, any appropriate number of vertical sync periods may be chosen for the average calculation so long as it covers an adequate number of time periods for each of the pilot signals.

The average pilot signal level calculated by the microcontroller unit 706 is inputted into a PWM (Pulse-Width Modulator, PWM) circuit 708 which generates two pulse-width modulated signals 712 and 714 whose duties are determined by the average pilot signal level. The frequency of the pulse-width modulated signals 712 and 714 may be any suitable value; in one preferred embodiment, it is about 10 MHz. The first pulse-width modulated signal 712 is processed by a low pass filter 716 to generate a first compensation control signal V_control, and the second pulse-width modulated signal 714 is processed by a low pass filter 718 to generate a second compensation control signal V_gain. The first and second compensation control signals are supplied to the color compensation circuit 524 and used to perform compensation of the high frequency part and low frequency part of the color video signals, respectively.

Referring back to FIGS. 6B and 6C, keyboard, mouse, audio, virtual media, and any data stream carried by the cable 504 is processed by a communication device 612 and inputted to the control section 702 and further processed there.

In the system shown in FIG. 2, because the CPU 208 outputs compensation control signal in digital form to the color compensation circuit 224, the values of the compensation control signal has a relatively coarse gradation. In the embodiment shown in FIG. 5, the compensation control signals (V_control and V_gain) are analog signals with continuous values. As a result, the amount of signal compensation by the color compensation circuit 524 can be controlled more finely as compared to the system shown in FIG. 2.

The cable length measurement and signal compensation system described above can be applied in many types of equipment. For example, it can be implemented on a keyboard video mouse (KVM) switch to measure lengths of cables with different types and lengths connected to the KVM switch for performing video signal compensation. It can also be used in video signal extenders and control dongles.

It will be apparent to those skilled in the art that various modification and variations can be made in the cable length measurement and signal compensation system method and apparatus of the present invention without departing from the spirit or scope of the invention. Thus, it is intended that the present invention cover modifications and variations that come within the scope of the appended claims and their equivalents.

What is claimed is:

1. A signal compensation system for processing a video signal transmitted over a cable, the cable having at least first, second and third pairs of wires, the video signal having first, second and third color signals each transmitted by a corresponding pair of wires, the system comprising:

a signal compressing circuit disposed upstream of the cable for compressing two or more electrical signals into the third color signal of the video signal transmitted by the third pair of wires when a vertical sync signal of the video signal is enabled, wherein the two or more electrical signals have different frequencies and are compressed into the third color signal during different time periods;

a signal converting circuit disposed downstream of the cable for converting the two or more electrical signals in the third color signal into direct current signals representing levels of the electrical signals after being transmitted by the cable; and a compensation control circuit for generating one or more compensation control signals based on the direct current signals representing levels of the electrical signals.

2. The signal compensation system of claim 1, wherein the signal compressing circuit compresses the vertical sync signal and a horizontal sync signal of the video signal into the first and second color signals of the video signal, respectively.

3. The signal compensation system of claim 1, wherein the signal compressing circuit further converts the first, second and third color signals into differential signals for transmission by the cable.

4. The signal compensation system of claim 1, wherein the electrical signals are square wave signals or sine wave signals.

5. The signal compensation system of claim 1, wherein three electrical signals are compressed into the third color signal of the video signal, and wherein the frequencies of the three electrical signals are 1 MHz, 4 MHz and 8 MHz, respectively.

6. The signal compensation system of claim 1, wherein the compensation control circuit comprises:

an analog-to-digital converting circuit for converting the direct current signals representing levels of the electrical signals into first digital values representing levels of the electrical signals; and a processor for calculating a second digital value representing an average of the first digital values over one or more time periods when the vertical sync signal is enabled.

7. The signal compensation system of claim 6, wherein the compensation control circuit further comprises:

a pulse-width modulating circuit for generating one or more pulse-width modulated signals each having a duty determined by the second digital value; and a circuit for generating one or more compensation control signals from the one or more pulse-width modulated signals, the one or more compensation control signals being analog signals having levels determined by the duties of the corresponding pulse-width modulated signals.

8. The signal compensation system of claim 1, wherein the signal compressing circuit compresses the vertical sync signal into the first color signal of the video signal, the system further comprising a vertical sync signal decode circuit disposed downstream of the cable for decoding the vertical sync signal from the first color signal and supplying the vertical sync signal to the compensation control circuit.

9. The signal compensation system of claim 1, wherein the first, second and third color signals includes a red color signal, a green color signal and a blue color signal.

10. The signal compensation system of claim 1, wherein the first, second and third color signals includes a luminance signal and two chrominance signals.

11. The signal compensation system of claim 1, wherein the signal converting circuit comprises an electrical signal decoder and a comparator.

12. The signal compensation system of claim 1, wherein the compensation control circuit generates the one or more compensation control signals by comparing an average of the direct current signals representing levels of the electrical signals with a reference signal.

13. A signal compensation method used in a video signal transmission system for transmitting a video signal having first, second and third color signals over a cable, the method comprising:
   (a) compressing two or more electrical signals into the third color signal of the video signal when a vertical sync signal of the video signal is enabled, wherein the two or more electrical signals have different frequencies and are compressed into the third color signal during different time periods;
   (b) transmitting the video signal over the cable, the cable having at least three pairs of wires, each color signal being transmitted over a pair of wires;
   (c) converting the two or more electrical signals in the third color signal into direct current signals representing levels of the electrical signals after being transmitted by the cable; and
   (d) generating one or more compensation control signals based on the direct current signals representing levels of the electrical signals.

14. The signal compensation method of claim 13, further comprising:
   before step (b), compressing the vertical sync signal and a horizontal sync signal into the first and second color signals of the video signal, respectively.

15. The signal compensation method of claim 13, further comprising:
   before step (b), converting the first, second and third color signals into differential signals.

16. The signal compensation method of claim 13, wherein the electrical signals are square wave signals.

17. The signal compensation method of claim 13, wherein step (a) includes compressing three electrical signals into the third color signal of the video signal, the frequencies of the three electrical signals being 1 MHz, 4 MHz and 8 MHz, respectively.

18. The signal compensation method of claim 13, wherein step (d) includes:
   (d1) converting the direct current signals representing levels of the electrical signals into first digital values representing levels of the electrical signals; and
   (d2) calculating a second digital value representing an average of the first digital values over one or more time periods when the vertical sync signal is enabled.

19. The signal compensation method of claim 18, wherein step (d) further includes:
   (d3) generating one or more pulse-width modulated signals each having a duty determined by the second digital value; and
   (d4) generating one or more compensation control signals from the one or more pulse-width modulated signals, the one or more compensation control signals being analog signals having levels determined by the duties of the corresponding pulse-width modulated signals.

20. The signal compensation method of claim 18, further comprising:
   before step (b), compressing the vertical sync signal into the first color signal of the video signal;
   after step (b), decoding the vertical sync signal from the first color signal;
   wherein step (d2) includes utilizing the decoded vertical sync signal to calculate the second digital value over a plurality of time periods when the vertical sync signal is enabled.

21. The signal compensation method of claim 13, wherein the first, second and third color signals includes a red color signal, a green color signal and a blue color signal.

22. The signal compensation method of claim 13, wherein the first, second and third color signals include a luminance signal and two chrominance signals.

* * * * *